United States Patent
Gwoo et al.

(10) Patent No.: US 11,964,910 B2
(45) Date of Patent: Apr. 23, 2024

(54) ENAMEL COMPOSITION, MANUFACTURING METHOD THEREFOR, AND COOKING UTENSILS

(71) Applicant: LG Electronics Inc., Seoul (KR)

(72) Inventors: Dong Gun Gwoo, Seoul (KR); Young Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 814 days.

(21) Appl. No.: 17/048,464

(22) PCT Filed: Apr. 17, 2019

(86) PCT No.: PCT/KR2019/004632
§ 371 (c)(1),
(2) Date: Oct. 16, 2020

(87) PCT Pub. No.: WO2019/203565
PCT Pub. Date: Oct. 24, 2019

(65) Prior Publication Data
US 2021/0163343 A1    Jun. 3, 2021

(30) Foreign Application Priority Data
Apr. 17, 2018 (KR) .................. 10-2018-0044374

(51) Int. Cl.
| | | |
|---|---|---|
| *C03C 8/08* | (2006.01) | |
| *C03C 8/06* | (2006.01) | |
| *C23D 1/02* | (2006.01) | |
| *F24C 15/00* | (2006.01) | |
| *C03C 8/10* | (2006.01) | |

(52) U.S. Cl.
CPC .............. *C03C 8/08* (2013.01); *C03C 8/06* (2013.01); *C23D 1/02* (2013.01); *F24C 15/005* (2013.01); *C03C 8/10* (2013.01); *C03C 2207/00* (2013.01)

(58) Field of Classification Search
CPC ...................................... C03C 8/08
See application file for complete search history.

(56) References Cited

U.S. PATENT DOCUMENTS

| | | |
|---|---|---|
| 5,993,974 A | 11/1999 | Fukushima et al. |
| 2002/0061809 A1 | 5/2002 | Aronica et al. |
| 2011/0049122 A1* | 3/2011 | Baek ............. F24C 15/005 |
| | | 219/385 |
| 2012/0282407 A1 | 11/2012 | Singh et al. |
| 2013/0299482 A1 | 11/2013 | Kim |
| 2018/0201538 A1 | 7/2018 | Strycker et al. |
| 2018/0215654 A1 | 8/2018 | Choi et al. |
| 2018/0215655 A1 | 8/2018 | Kim et al. |

FOREIGN PATENT DOCUMENTS

| | | | |
|---|---|---|---|
| EP | 0916624 | 5/1999 | |
| EP | 1160283 A1 * | 12/2001 | ............. C03C 3/066 |
| EP | 1190994 | 3/2002 | |
| EP | 3357876 | 8/2018 | |
| EP | 3357877 | 8/2018 | |
| JP | 2014518834 | 8/2014 | |
| KR | 20110023079 | 3/2011 | |
| KR | 20130125918 | 11/2013 | |
| KR | 20180089987 | 8/2018 | |
| KR | 20180089988 | 8/2018 | |
| SU | 631478 | 11/1978 | |
| WO | WO2011013797 | 2/2011 | |
| WO | WO2017016952 | 2/2017 | |

OTHER PUBLICATIONS

Notice of Allowance in Korean Appln. No. 102023053601444, dated May 13, 2023, 10 pages (with English translation).
Extended European Search Report in European Appln. No. 19788348.1, dated Jan. 4, 2022, 8 pages.

\* cited by examiner

*Primary Examiner* — Elizabeth A. Bolden
(74) *Attorney, Agent, or Firm* — Fish & Richardson P.C.

(57) ABSTRACT

The present invention relates to an enamel composition capable of implementing cleaning without swelling using moisture, to a manufacturing method therefor, and to cooking utensils. The enamel composition according to the present invention comprises: 20-60 wt % of $P_2O_5$; 1-20 wt % of $SiO_2$; 1-30 wt % of $B_2O_3$; 10-30 wt % of at least one of $Li_2O$, $Na_2O$, and $K_2O$; 10-40 wt % of at least one selected from the group consisting of post-transition metal oxides and transition metal oxides. Therefore, the present invention provides an enamel composition capable of implementing cleaning without swelling using moisture, a manufacturing method therefor, and cooking utensils.

8 Claims, 1 Drawing Sheet

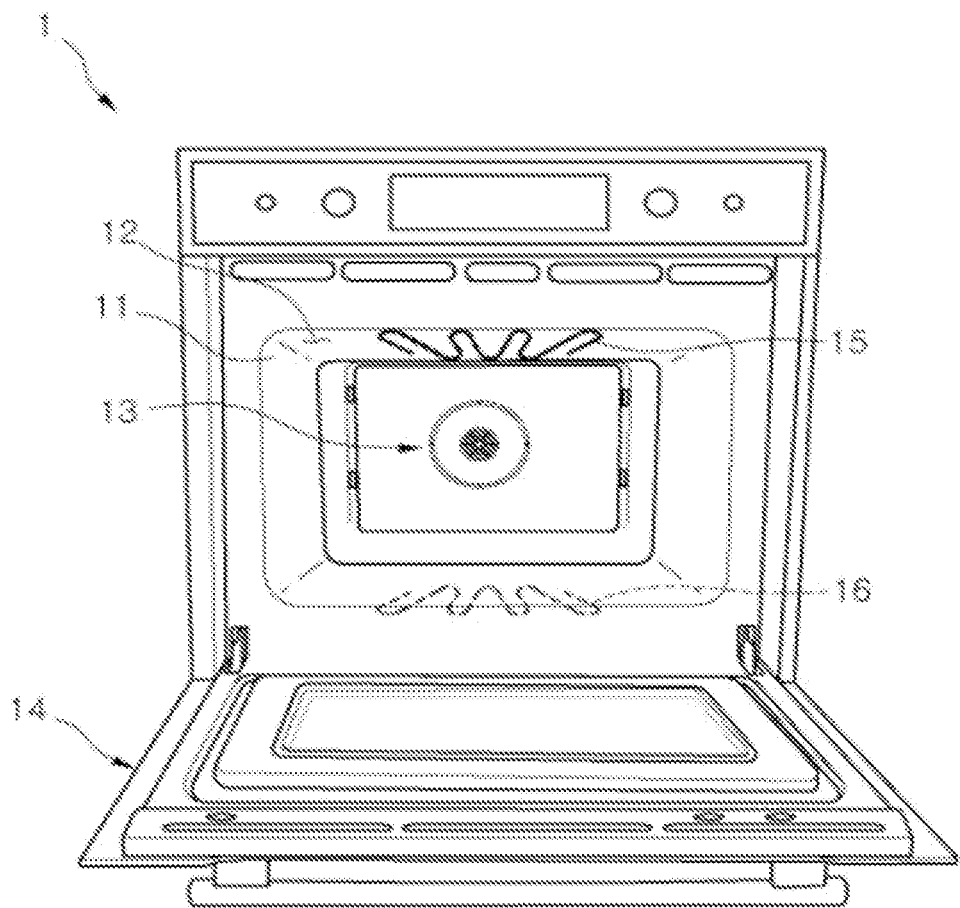

ENAMEL COMPOSITION, MANUFACTURING METHOD THEREFOR, AND COOKING UTENSILS

CROSS-REFERENCE TO RELATED APPLICATIONS

This application is a National Stage application under 35 U.S.C. § 371 of International Application No. PCT/KR2019/004632, filed on Apr. 17, 2019, which claims the benefit of Korean Patent Application No. 10-2018-0044374, filed on Apr. 17, 2018. The disclosures of the prior applications are incorporated by reference in their entirety.

TECHNICAL FIELD

Disclosed herein is an enamel composition, a preparation method therefor, and a cooking appliance using the same which can be cleaned without being soaked in water.

BACKGROUND ART

Enamel is a substance where a glass glaze is applied onto a surface of a metallic plate. Ordinary enamel is used for cooking appliances, such as microwave ovens and ovens, for example.

Cooking appliances, such as electric ovens and gas ovens, for example, are devices that cook food or other items (hereinafter, collectively "food") using a heat source. Contaminants, for example, produced during cooking, are attached to an inner wall of a cavity of a cooking appliance. Accordingly, the inner wall of the cavity needs to be cleaned. The inner wall of the cavity can be easily cleaned through a pyrolysis where contaminants are burned to ashes at high temperatures, or with a strong alkaline detergent. Further, the inner wall of the cavity, coated with an enamel composition including phosphorus pentoxide ($P_2O_5$), silicon dioxide ($SiO_2$), boron trioxide ($B_2O_3$), and Group I oxides, can be easily cleaned without a high-temperature heating process.

Although the enamel composition includes $P_2O_5$, $SiO_2$, $B_2O_3$, and Group I oxides, the enamel composition needs to be soaked in water for a certain period of time such that a contaminant such as poultry fat or monster mash is cleaned from the enamel composition.

When the enamel composition includes $P_2O_5$ and Group I oxides, durability of a calcinated enamel composition can be degraded.

Additionally, when the enamel composition includes $P_2O_5$-$B_2O_3$, glass crystallization tendencies can be increased during a calcination process, causing degradation in color quality and luminance.

SUMMARY

Technical Problems

The present disclosure is directed to an enamel composition from which a contaminant such as poultry fat or monster mash may be cleaned without being soaked in water.

The present disclosure is also directed to an enamel composition that may have a new composition ratio not to cause degradation in durability although the enamel composition includes $P_2O_5$ and Group I oxides.

The present disclosure is also directed to an enamel composition that may not cause glass crystallization during a calcination process although the enamel composition includes $P_2O_5$—$B_2O_3$.

TECHNICAL SOLUTIONS

According to embodiments, an enamel composition, from which a contaminant such as poultry fat or monster mash is cleaned without being soaked in water, may comprise 20 wt % to 60 wt % of phosphorus pentoxide ($P_2O_5$), 1 wt % to 20 wt % of silicon dioxide ($SiO_2$), 1 wt % to 30 wt % of boron trioxide ($B_2O_3$), 10 wt % to 30 wt % of at least one of lithium oxide ($Li_2O$), sodium oxide ($Na_2O$), and potassium oxide ($K_2O$), and 10 wt % to 40 wt % of at least one from a group consisting of post-transition metal oxides and transition metal oxides.

According to embodiments, an enamel composition, which has a new composition ratio not to cause degradation in durability although the enamel composition comprises $P_2O_5$ and Group I oxides, may comprise at least one of Group II oxides including magnesium oxide (MgO), barium oxide (BaO) and calcium oxide (CaO), 10 wt % to 30 wt % of aluminum oxide ($Al_2O_3$), 1 wt % to 5 wt % of zirconium dioxide ($ZrO_2$) and 1 wt % to 5 wt % of tin oxide (SnO).

According to embodiments, for an enamel composition which causes no glass crystallization during a calcination process although the enamel composition comprises $P_2O_5$—$B_2O_3$, an amount of $P_2O_5$ and $B_2O_3$ may satisfy a formula below.

$$1 \leq P_2O_5(\text{wt \%})/B_2O_3(\text{wt \%}) \leq 10 \quad \text{[Formula]}$$

Advantageous Effects

The enamel composition may comprise $P_2O_5$; $SiO_2$; $B_2O_3$; at least one of $Li_2O$, $Na_2O$, $K_2O$; and at least one from a group consisting of post-transition metal oxides and transition metal oxides. Accordingly, the enamel composition may have a new component system at a unique ratio, and may be cleaned without being soaked in water.

Additionally, for the enamel composition, glass frits may comprise at least one of Group II oxides including magnesium oxide (MgO), barium oxide (BaO) and calcium oxide (CaO), and 10 wt % to 30 wt % of aluminum oxide ($Al_2O_3$), 1 wt % to 5 wt % of zirconium dioxide ($ZrO_2$) and 1 wt % to 5 wt % of tin oxide (SnO). Accordingly, the enamel composition may not cause degradation in durability.

Further, the enamel composition may have an optimal ratio of $P_2O_5$ to $B_2O_3$. Accordingly, the enamel composition causes no glass crystallization during a calcination process and may ensure excellent color quality and luminance.

BRIEF DESCRIPTION OF DRAWING

Figure is a front view showing an example cooking appliance.

BEST MODE

The above-described aspects, features and advantages are specifically described with reference to the accompanying drawings hereunder such that one having ordinary skill in the art to which the present disclosure pertains may easily implement the technical spirit of the disclosure. In description of the disclosure, detailed description of known technologies in relation to the disclosure is omitted if it is deemed to make the gist of the disclosure unnecessarily vague. Below, preferred embodiments according to the disclosure are specifically described.

The embodiments set forth herein may be implemented in various different forms, and should not be construed as being limited to the present disclosure. Rather, these embodiments are provided as examples so that the disclosure will be thorough and complete and will fully convey the subject matter to one having ordinary skill in the art to which the disclosure pertains. Below, an enamel composition, a preparation method therefor, and a cooking appliance using the same, which may be cleaned without being soaked in water, are described specifically.

Enamel Composition

An enamel composition according to embodiments may comprise 20 wt % to 60 wt % of phosphorus pentoxide ($P_2O_5$); 1 wt % to 20 wt % of silicon dioxide ($SiO_2$); 1 wt % to 30 wt % of boron trioxide ($B_2O_3$); 10 wt % to 30 wt % of at least one of lithium oxide ($Li_2O$), sodium oxide ($Na_2O$) and potassium oxide ($K_2O$); and 10 wt % to 40 wt % of at least one from a group consisting of post-transition metal oxides and transition metal oxides.

In the disclosure, the post-transition metal oxides may denote a compound in which metallic elements such as aluminum (Al), gallium (Ga), indium (In), tin (Sn), thallium (Tl), plumbum (Pb), bismuth (Bi) or polonium (Po) in the p-block of the periodic table are combined with oxygen. The post-transition metal oxides and the transition metal oxides usually serve as a catalyst thanks to their structural stability.

$P_2O_5$ may form an alkali phosphate glass structure. $P_2O_5$ may serve as a glass former that helps addition of a large amount of transition metal oxides into the enamel composition and helps water to permeate between an enamel surface and a contaminant, such that the contaminant is easily removed. The component $P_2O_5$ may be included in a range of 20 to 60 wt %. When more than 60 wt % of $P_2O_5$ is included, the enamel composition is hardly glazed, and thermal properties of the enamel composition may be degraded. When less than 20 wt % of $P_2O_5$ is included, an amount of added transition metal oxides may be reduced. Accordingly, $P_2O_5$ may not properly serve as a glass former and may not properly remove contaminants.

$SiO_2$, which is a component for forming a glass structure, may strengthen a skeleton of the glass structure and improve chemical resistance of the enamel composition. The component $SiO_2$ may be included in a range of 1 wt % to 20 wt %. When more than 20 wt % of $SiO_2$ is included, the component may interfere with an addition of a transition metal oxide, causing deterioration in a cleaning performance of the enamel composition. When less than 1 wt % of $SiO_2$ is included, glass composition may be collapsed.

$B_2O_3$ may serve as a glass former and help each component of the enamel composition to melt uniformly, thereby making it possible to prevent crystallization of a glass composition. $B_2O_3$ may also adjust a coefficient of thermal expansion and a fusion flow of the enamel composition to improve a coating performance of the enamel composition. $B_2O_3$ may be included in a range of 1 wt % to 30 wt %. When more than 30 wt % of $B_2O_3$ is included, the component may interfere with an addition of a transition metal oxide, causing deterioration in the cleaning performance of the enamel composition. When less than 1 wt % of $B_2O_3$ is included, glass composition may be collapsed, or crystallization of a glass composition may occur.

$Li_2O$, $Na_2O$, and $K_2O$, which are Group I oxides, may be include in the enamel composition to improve the cleaning performance of the enamel composition along with $P_2O_5$. At least one of $Li_2O$, $Na_2O$, and $K_2O$ may be included in a range of 10 wt % to 30 wt %. When more than 30 wt % of at least one of $Li_2O$, $Na_2O$, and $K_2O$ is included, the thermal properties of the enamel composition may be degraded. When less than 10 wt % of at least one of $Li_2O$, $Na_2O$, and $K_2O$ is included, the cleaning performance of the enamel composition may be deteriorated.

Post-transition metal oxides and transition metal oxides may facilitate catalysis on an enamel surface and may easily disconnect a contaminant from the enamel surface. At least one from the group consisting of post-transition metal oxides and transition metal oxides may be included in a range of 10 wt % to 40 wt %. When more than 40 wt % of at least one from the group consisting of post-transition metal oxides and transition metal oxides is included, the enamel composition may be hardly glazed and the thermal properties of the enamel composition may be degraded. When less than 10 wt % of at least one from the group consisting of post-transition metal oxides and transition metal oxides is included, a level of catalysis on the enamel surface may be reduced, causing deterioration in the cleaning performance.

The post-transition metal oxide may comprise bismuth oxide ($Bi_2O_3$) Additionally, the transition metal oxide may comprise at least one of titanium oxide ($TiO_2$), vanadium oxide ($V_2O_5$), manganese oxide (MnO), iron oxide ($Fe_2O_3$), copper oxide (CuO), zinc oxide (ZnO), tungsten trioxide ($WO_3$), and molybdenum trioxide ($MoO_3$) The transition metal oxide ZnO may be included in a range of 5 wt % to 20 wt %, the transition metal oxide $MoO_3$ may be included in a range of 1 wt % to 20 wt %, and the post-transition metal oxide $Bi_2O_3$ may be included in a range of 10 wt % to 20 wt %.

ZnO may improve the cleaning performance and control a surface tension, thereby making it possible to improve surface characteristics of an enamel coating layer. The component ZnO may be included in a range of 5 wt % to 20 wt %. When more than 20 wt % of ZnO is included, a fusion flow may be reduced. When less than 5 wt % of ZnO is included, the surface characteristics of the enamel coating layer may be degraded, causing deterioration in the coating performance.

$MoO_3$ may facilitate catalysis on the enamel surface and provide the effect of cleaning. $MoO_3$, which is a transition metal oxide having a valence of 6, may trigger catalysis excellently and improve the cleaning performance. The component $MoO_3$ may be included in a range of 1 wt % to 20 wt %. When more than 20 wt % of $MoO_3$ is included, the thermal properties may be degraded. When less than 1 wt % of $MoO_3$ is included, the cleaning performance may be deteriorated.

$Bi_2O_3$ may facilitate catalysis on the enamel surface and provide the effect of cleaning. Additionally, $Bi_2O_3$ may improve chemical resistance and thermal resistance of enamel. The component $Bi_2O_3$ may be included in a range of 10 wt % to 20 wt %. When more than 20 wt % of $B_2O_3$ is included, a level of catalysis may be reduced, and the cleaning performance may be deteriorated. When less than 10 wt % of $B_2O_3$ is included, chemical resistance and thermal resistance of enamel may be degraded.

The enamel composition according to embodiments may comprise at least one of magnesium oxide (MgO), barium oxide (BaO), and calcium oxide (CaO) that are Group IIoxides. MgO, BaO, and CaO, which are Group IIoxides, may improve adhesion between a calcinated enamel composition and a steel sheet. At least one of MgO, BaO, and CaO may be included in a range of 1 wt % to 30 wt %. When more than 30 wt % of at least one of MgO, BaO, and CaO is included, the cleaning performance may be deteriorated. When less than 1 wt % of at least one of MgO, BaO, and CaO is included, adhesion between a calcinated enamel composition and a steel sheet may be reduced, resulting in a lower stability of glass.

The enamel composition according to embodiments may comprise at least one of sodium fluoride (NaF), calcium fluoride ($CaF_2$), and aluminum fluoride ($AlF_3$). The components NaF, $CaF_2$, and $AlF_3$ may control a surface tension of enamel and improve surface characteristics of an enamel coating layer. At least one of the components NaF, $CaF_2$, and $AlF_3$ may be included in a range of 1 wt % to 5 wt %. When more than 5 wt % of at least one of the components NaF, $CaF_2$, and $AlF_3$ is included, the thermal properties may be degraded. When less than 1 wt % of at least one of the components NaF, $CaF_2$, and $AlF_3$ is included, the surface characteristics of the enamel coating layer may be degraded, and stability of glass may be reduced.

The enamel composition according to embodiments may comprise at least one of aluminum oxide ($Al_2O_3$), zirconium dioxide ($ZrO_2$), and tin oxide (SnO). The component $Al_2O_3$ may be included in a range of 10 wt % to 30 wt %, the component $ZrO_2$ may be included in a range of 1 wt % to 5 wt %, and the component SnO may be included in a range of 1 wt % to 5 wt %. $Al_2O_3$, $ZrO_2$, and SnO may improve durability of an alkali phosphate glass structure and hardness of the enamel surface. When more than 30 wt % of $Al_2O_3$ is included, adhesion of the enamel composition may be reduced due to a high melting temperature and fusion flow. When more than 5 wt % of $ZrO_2$ or SnO is included, a glass structure may hardly be formed. When less than 10 wt % of $Al_2O_3$ is included, or when less than 1 wt % of $ZrO_2$ or SnO is included, durability of enamel may be reduced.

When $P_2O_5$ and $B_2O_3$ included in the enamel composition according to embodiments satisfy the following formula, calcination reliability in relation to glass crystallization tendencies may be ensured.

$$1 \leq P_2O_5(wt\%)/B_2O_3(wt\%) \leq 10 \quad \text{[Formula]}$$

The components $P_2O_5$ and $B_2O_3$ may control a surface tension and a coefficient of thermal expansion of a calcinated enamel composition. Accordingly, the components $P_2O_5$ and $B_2O_3$ may affect calcination reliability related to glass crystallization tendencies. When a greater amount of $P_2O_5$ is included, a large amount of transition metal oxides may be easily added. However, glass crystallization tendencies of the enamel composition may increase. Accordingly, an optimal ratio has to be ensured between $P_2O_5$ and $B_2O_3$. Thus, in the enamel composition, $P_2O_5$ (wt %)/$B_2O_3$ (wt %) may be 1 to 10.

The enamel composition, for example, may have a coefficient of thermal expansion (CTE) of 70 to $90 \times 10^{-7}$/° C. within a range of 50° C. to 350° C. and a glass strain temperature of a range of 520° C. to 720° C., after calcination. The coefficient of thermal expansion (CTE) may be within a range of 70 to $90 \times 10^{-7}$/° C. in the range of 50° C. to 350° C. Accordingly, as adhesion of the enamel composition is increased, a glass structure may become more reliable. As the glass strain temperature is within the range of 520° C. to 720° C., the enamel composition may form a structure that is not deformed even at high temperatures.

Preparation Method for Enamel Composition

A preparation method for an enamel composition according to embodiments may comprise supplying materials for an enamel composition including 20 wt % to 60 wt % of phosphorus pentoxide ($P_2O_5$), 1 wt % to 20 wt % of silicon dioxide ($SiO_2$), 1 wt % to 30 wt % of boron trioxide ($B_2O_3$), and 10 wt % to 30 wt % of at least one of lithium oxide ($Li_2O$), sodium oxide ($Na_2O$), and potassium oxide ($K_2O$), and 10 wt % to 40 wt % of at least one from a group consisting of post-transition metal oxides and transition metal oxides; melting the materials for an enamel composition; and cooling the melted materials in a quenching roller and forming an enamel composition.

The enamel composition may comprise at least one of magnesium oxide (MgO), barium oxide (BaO), and calcium oxide (CaO). Additionally, the enamel composition may further comprise at least one of sodium fluoride (NaF), calcium fluoride ($CaF_2$), and aluminum fluoride ($AlF_3$). Further, the enamel composition may further comprise 10 wt % to 30 wt % of aluminum oxide ($Al_2O_3$), 1 wt % to 5 wt % of zirconium dioxide ($ZrO_2$), and 1 wt % to 5wt % of tin oxide (SnO).

Ammonium dihydrogen phosphate ($NH_4H_2PO_4$) may be used as a raw material for $P_2O_5$, and sodium carbonate ($Na_2CO_3$), potassium carbonate ($K_2CO_3$), lithium carbonate ($Li_2CO_3$), barium carbonate ($BaCO_3$), and calcium carbonate ($CaCO_3$) may be respectively used as a raw material for $Na_2O$, $K_2O$, $Li_2O$, Ba), and CaO, but not be limited.

After sufficiently mixed, the materials for an enamel composition may be melted. For example, the materials for an enamel composition may be melted at 1200° C. to 1400° C. for one to two hours.

Then the melted materials for an enamel composition may be rapidly cooled in a quenching roller, using a chiller and the like. Thus, the enamel composition may be prepared.

Cooking Appliance

The enamel composition according to embodiments may be coated on one surface of an object to be coated with the enamel composition. The object may comprise a metal plate, a glass plate, and all or part of a cooking appliance. For example, an inner surface of a cavity or a door of a cooking appliance may be coated with the enamel composition.

Referring to Figure a cooking appliance 1 may comprise a cavity 11 in which a cooking chamber 12 is formed, a door 14 that opens and closes the cooking chamber 12, and at least one heat source 13,15,16 that supplies heat for cooking food in the cooking chamber 12. The cavity 11 may have a cuboid shape, a front surface of which is open. The heat source 13, 15, 16 may comprise a convection assembly 13 that discharges heated air into the cavity 11, an upper heater 15 disposed at an upper portion of the cavity 11, and a lower heater 16 disposed at a lower portion of the cavity 11. The upper heater 15 and the lower heater 16 may be provided inside or outside of the cavity 11. The heat source 13, 15, 16 may not necessarily include all the convection assembly 13, the upper heater 15, and the lower heater 16. That is, the heat source 13, 15, 16 may include at least one of the convection assembly 13, the upper heater 15, and the lower heater 16.

The enamel composition according to embodiments may be coated on an inner surface of the cavity 11 or the door 14 of the cooking appliance 1 in a dry process or a wet process.

During the dry process, the materials for an enamel composition may be dispersed in an organic binder, the mixed materials and organic binder may be milled in a ball mill, and a glass frit may be manufactured. During the wet process, the materials for an enamel composition may be dispersed in water ($H_2O$) and pigment, the mixed materials, water ($H_2O$) and pigment may be milled in a ball mill, and a glass frit may be manufactured.

Then the glass frit prepared in the dry process or the wet process may be applied onto the inner surface of the cavity 11 or the door 14 of the cooking appliance 1 through a spray process, for example. The applied glass frit may be calcinated for 100 to 450 seconds at 600° C. to 900° C., and may be coated on the inner surface of the cavity 11 or the door 14 of the cooking appliance 1.

Hereinafter, embodiments will be described with reference to examples.

EXAMPLE

Preparation for Enamel Composition

An enamel composition having a composition ratio in table 1 below was prepared. A raw material for each component was sufficiently mixed for three hours in a V-mixer. Ammonium dihydrogen phosphate ($NH_4H_2PO_4$) was used as a raw material for $P_2O_5$, and sodium carbonate ($Na_2CO_3$), potassium carbonate ($K_2CO_3$), lithium carbonate ($Li_2CO_3$), barium carbonate ($BaCO_3$), and calcium carbonate ($CaCO_3$) were respectively used as a raw material for $Na_2O$, $K_2O$, $Li_2O$, BaO, and CaO. The remaining materials are shown in table 1. The mixed materials were sufficiently melted for one and a half hours at 1300° C. and were rapidly cooled in a quenching roller. Then a glass cullet was obtained.

Initial granularity of the glass cullet obtained in the above-described processes was controlled with a grinder (a ball mill), and the glass cullet was ground for about five hours using a jet mill. Then the ground glass cullet was allowed to pass through a 325 mesh sieve (ASTM C285-88) such that a particle diameter of the glass cullet was limited to 45 µm or less. As a result, frits (powder) were prepared. The frits were sprayed onto a low carbon steel sheet with a width of 200 mm, a height of 200 mm, and a thickness of 1 mm or less, using a corona discharge gun. A voltage of the discharge gun was controlled under the conditions of 40 kV to 100 kV, and an amount of the frits sprayed on the low carbon steel sheet was 300 g/m². The low carbon steel sheet, onto which the frits were sprayed, was calcinated at 830° C. to 870° C. for 300 to 450 seconds to form a coating layer on one surface of the low carbon steel sheet. The coating layer was formed to have thicknesses of about 80 µm to 250 µm.

Preparation for Enamel Composition Sample

About four grams of 10 enamel compositions according to embodiments 1 to 7 and comparative examples 1 to 3 were put on a low carbon steel sheet with a width of 100 mm, a height of 100 mm, and a thickness of 1 mm, and was coated on the low carbon steel sheet simply by hand. Then the enamel composition samples were calcinated at about 700° C. for 400 seconds. Finally, a total of 10 enamel compositions samples were obtained.

EXPERIMENTAL EXAMPLE

Performance of the enamel composition samples prepared in the embodiments and comparative examples was evaluated as follows. Table 3 shows results of the evaluation.

1. Evaluation of Cleaning Performance

To evaluate a cleaning performance of the enamel composition samples, 1g of chicken fat as a contaminant was evenly thinly applied using a brush on a surface of the samples, where a metallic substrate (100×100 mm) was coated with the enamel compositions, and then a specimen, to which the contaminant was applied, was put into a thermostat at 250° C. to 290° C. for an hour to fix the contaminant.

After the fixation, the specimen was naturally cooled and a hardness of the contaminant was checked. Then the hardened chicken fat was cleaned with a kitchen scrubber for a frying pan wet with room-temperature water, using a force of 3 kgf or less. A portion on the contaminated surface of the samples, cleaned using a rod having a flat bottom and a diameter of 5 cm, was uniformized. Frequency of back and forth cleaning motions was measured and the frequency was defined as frequency of back and forth cleaning motions. Table 2 shows indices of evaluation of the cleaning performance.

Additionally, a cleaning performance against monster mash was evaluated according to the same method as the method described above.

TABLE 1

| Component (wt %) | Embodiment | | | | | | | Comparative example | | |
|---|---|---|---|---|---|---|---|---|---|---|
| | 1 | 2 | 3 | 4 | 5 | 6 | 7 | 1 | 2 | 3 |
| $P_2O_5$ | 24.26 | 22.34 | 30.82 | 22.65 | 22.69 | 24.12 | 23.22 | 22.34 | 22.34 | 36.82 |
| $SiO_2$ | 14.12 | 14.56 | 7.92 | 10.52 | 10.51 | 9.23 | 10.32 | 26.56 | 46.56 | 7.92 |
| $B_2O_3$ | 8.88 | 12.29 | 6.79 | 10.23 | 10.22 | 10.14 | 6.22 | 12.29 | 11.46 | 0.79 |
| $Li_2O$ | 0.86 | 0.88 | 0.00 | 0.00 | 0.00 | 2.11 | 2.11 | 0.88 | 0.88 | 0.00 |
| $Na_2O$ | 4.52 | 4.21 | 2.73 | 4.02 | 5.78 | 0.00 | 1.66 | 4.21 | 4.21 | 2.73 |
| $K_2O$ | 10.15 | 10.48 | 10.77 | 6.56 | 6.65 | 10.22 | 10.32 | 10.48 | 2.48 | 10.77 |
| $TiO_2$ | 0.87 | 0.89 | 0.00 | 0.26 | 0.58 | 0.00 | 1.32 | 0.89 | 3.89 | 1.87 |
| $V_2O_5$ | 0.00 | 0.00 | 0.00 | 0.64 | 0.00 | 1.33 | 0.00 | 0.00 | 0.00 | 0.00 |
| MnO | 0.00 | 0.00 | 0.00 | 0.00 | 1.32 | 0.00 | 0.00 | 0.00 | 0.00 | 0.00 |
| $Fe_2O_3$ | 0.00 | 0.00 | 0.00 | 0.00 | 0.00 | 3.32 | 0.00 | 0.00 | 0.00 | 0.00 |
| CuO | 0.00 | 0.00 | 0.00 | 0.18 | 0.00 | 1.23 | 0.00 | 0.00 | 0.00 | 0.00 |
| $WO_3$ | 0.00 | 0.00 | 0.00 | 0.89 | 5.15 | 0.00 | 0.00 | 0.00 | 0.00 | 0.00 |
| $Bi_2O_3$ | 0.00 | 0.00 | 1.87 | 11.24 | 6.25 | 5.26 | 15.21 | 0.00 | 0.00 | 0.00 |
| ZnO | 5.76 | 5.02 | 5.74 | 5.69 | 6.25 | 5.65 | 5.02 | 5.02 | 5.02 | 5.74 |
| $MoO_3$ | 9.66 | 13.40 | 13.96 | 11.22 | 8.25 | 10.31 | 8.55 | 1.40 | 1.40 | 13.96 |
| MgO | 0.00 | 0.00 | 0.00 | 0.00 | 1.02 | 0.00 | 1.23 | 0.00 | 0.00 | 0.00 |
| BaO | 0.00 | 1.02 | 1.23 | 1.03 | 0.00 | 0.00 | 0.00 | 1.02 | 0.00 | 1.23 |
| CaO | 1.72 | 0.00 | 0.00 | 0.00 | 0.00 | 1.14 | 0.00 | 0.00 | 0.00 | 0.00 |
| NaF | 0.00 | 1.76 | 1.12 | 1.65 | 0.00 | 1.25 | 0.00 | 1.76 | 1.76 | 1.12 |
| $CaF_2$ | 1.7 | 0.00 | 0.00 | 0.00 | 0.00 | 0.00 | 1.14 | 0.00 | 0.00 | 0.00 |
| $AlF_3$ | 0.00 | 0.00 | 0.00 | 0.00 | 1.23 | 0.00 | 0.00 | 0.00 | 0.00 | 0.00 |
| $Al_2O_3$ | 11.53 | 10.79 | 14.09 | 10.54 | 10.56 | 11.32 | 10.56 | 10.79 | 0.00 | 14.09 |
| $ZrO_2$ | 4.1 | 1.24 | 1.75 | 1.45 | 2.32 | 1.26 | 1.47 | 1.24 | 0.00 | 1.75 |
| SnO | 1.87 | 1.12 | 1.21 | 1.23 | 1.22 | 2.11 | 1.65 | 1.12 | 0.00 | 1.21 |

TABLE 2

| Frequency of back and forth cleaning motion | Level |
|---|---|
| 1~10 | LV. 5 |
| 10~15 | LV. 4 |
| 16~25 | LV. 3 |
| 26~50 | LV. 2 |
| 51~ | LV. 1 |

2. Evaluation of Acid Resistance and Alkali Resistance

Acid resistance and alkali resistance of the enamel composition samples were evaluated based on ASTM and ISO 2722. The grading scale is described as follows: AA (Very good); A (Good); B (Average); C (Poor); D (Very poor).

3. Evaluation of Calcination Reliability

The enamel compositions were put into a metallic mold, pressed, molded and then calcinated at a temperature that was raised up to 600° C. at a rate of 10° C./min, and observed to determine whether the enamel compositions were crystallized (⊚: No crystallization, and excellent color quality and luminance; ○: No crystallization, and good color quality and luminance; ×: Crystallization and no color glow).

TABLE 3

|  | Embodiment | | | | | | | Comparative example | | |
|---|---|---|---|---|---|---|---|---|---|---|
|  | 1 | 2 | 3 | 4 | 5 | 6 | 7 | 1 | 2 | 3 |
| Cleaning performance | LV. 4 | LV. 5 | LV. 5 | LV. 5 | LV. 5 | LV. 5 | LV. 5 | LV. 2 | LV. 1 | LV. 3 |
| Acid resistance | A | A | A | A | A | A | A | A | A | B |
| Alkali resistance | A | A | AA | AA | A | AA | AA | AA | AA | A |
| Calcination reliability | ○ | ⊚ | ○ | ⊚ | ○ | ⊚ | ⊚ | ○ | ○ | X |

As shown in Table 3, the embodiments according to the present disclosure ensured an excellent cleaning performance and had excellent acid resistance, alkali resistance and calcination reliability.

Unlike the embodiments, the comparative examples showed deterioration in the cleaning performance due to a small amount of the post-transition metal oxide and transition metal oxides, or caused a degradation in durability and calcination reliability due to instability in glass composition.

The embodiments have been described with reference to a number of illustrative embodiments thereof. However, it should be understood that the present disclosure is not intended to limit the embodiments and drawings set forth herein and that numerous other modifications and embodiments can be devised by those skilled in the art. Additionally, though not explicitly described during description of the embodiments, predictable effects based on the configurations of the embodiments should be acknowledged.

DESCRIPTION OF SYMBOLS

1: Cooking appliance
11: Cavity
12: Cooking chamber
13: Convection assembly
14: Door
15: Upper heater
16: Lower heater

The invention claimed is:

1. An enamel composition, comprising:
    20 wt % to 60 wt % of phosphorus pentoxide ($P_2O_5$);
    1 wt % to 20 wt % of silicon dioxide ($SiO_2$);
    1 wt % to 30 wt % of boron trioxide ($B_2O_3$);
    10 wt % to 30 wt % of at least one of lithium oxide ($Li_2O$), sodium oxide ($Na_2O$), and potassium oxide ($K_2O$); and
    10 wt % to 40 wt % of at least one from a group consisting of post-transition metal oxides and transition metal oxides such that the enamel composition comprises 5 wt % to 20 wt % of zinc oxide (ZnO) and 1 wt % to 20 wt % of molybdenum trioxide ($MoO_3$).

2. The enamel composition of claim 1, wherein the post-transition metal oxides comprise $Bi_2O_3$, and
    wherein the transition metal oxides further comprise at least one of titanium oxide ($TiO_2$), vanadium oxide ($V_2O_5$), manganese oxide (MnO), iron oxide ($Fe_2O_3$), copper oxide (CuO), or tungsten trioxide ($WO_3$).

3. The enamel composition of claim 1, wherein the enamel composition further comprises Group II oxides, and
    wherein the Group II oxides comprise at least one of magnesium oxide (MgO), barium oxide (BaO) or calcium oxide (CaO).

4. The enamel composition of claim 1, further comprising at least one of sodium fluoride (NaF), calcium fluoride (CaF2), aluminum fluoride ($AlF_3$).

5. The enamel composition of claim 1, wherein an amount of $P_2O_5$ and an amount of $B_2O_3$ satisfy a formula below;

$$1 \le P_2O_5(\text{wt \%})/B_2O_3(\text{wt \%}) \le 10 \qquad \text{[Formula ].}$$

6. A preparation method for an enamel composition, comprising:
    supplying materials for the enamel composition, the enamel composition including 20 wt % to 60 wt % of phosphorus pentoxide ($P_2O_5$), 1 wt % to 20 wt % of silicon dioxide ($SiO_2$), 1 wt % to 30 wt % of boron trioxide ($B_2O_3$), and 10 wt % to 30 wt % of at least one of lithium oxide ($Li_2O$), sodium oxide ($Na_2O$), and potassium oxide ($K_2O$), and 10 wt % to 40 wt % of at least one from a group consisting of post-transition metal oxides and transition metal oxides such that the enamel composition includes 5 wt % to 20 wt % of zinc oxide (ZnO) and 1 wt % to 20 wt % of molybdenum trioxide ($MoO_3$);
    melting the materials for the enamel composition; and
    cooling the melted materials in a quenching roller and forming the enamel composition.

7. An enamel composition, comprising:
    20 wt % to 60 wt % of phosphorus pentoxide ($P_2O_5$);
    1 wt % to 20 wt % of silicon dioxide ($SiO_2$);
    1 wt % to 30 wt % of boron trioxide ($B_2O_3$);
    10 wt % to 30 wt % of at least one of lithium oxide ($Li_2O$), sodium oxide ($Na_2O$), or potassium oxide ($K_2O$);
    5 wt % to 20 wt % of zinc oxide (ZnO); and
    1 wt % to 20 wt % of molybdenum trioxide ($MoO_3$).

8. The enamel composition of claim 7, further comprising 10 wt % to 20 wt % of bismuth oxide ($Bi_2O_3$).

* * * * *